United States Patent [19]

Nawa et al.

[11] Patent Number: 4,531,040
[45] Date of Patent: Jul. 23, 1985

[54] HOT WIRE TYPE ARC WELDING TORCH AND CABLE

[75] Inventors: Akiyoshi Nawa; Yoshiaki Kato; Takao Shimizu, all of Aichi, Japan

[73] Assignee: Mitsubishi Denki K.K., Tokyo, Japan

[21] Appl. No.: 455,078

[22] Filed: Jan. 3, 1983

[30] Foreign Application Priority Data

Jan. 11, 1982 [JP] Japan ................. 57-1929[U]
Jan. 11, 1982 [JP] Japan ................. 57-1931[U]

[51] Int. Cl.³ .............................................. B23K 9/16
[52] U.S. Cl. .................... 219/74; 219/137.9; 219/136
[58] Field of Search ............ 219/74, 75, 76.14, 76.15, 219/76.16, 136, 137.52, 137.9

[56] References Cited

U.S. PATENT DOCUMENTS 3,549,855 12/1970 Lawrence ................. 219/75
3,940,586 2/1976 Stearns et al. .............. 219/75
4,159,410 6/1979 Cooper .................. 219/75 X
4,303,823 12/1981 Stine .................... 219/75

FOREIGN PATENT DOCUMENTS 1565165 8/1973 Fed. Rep. of Germany ........ 219/74

Primary Examiner—Roy N. Envall, Jr.
Assistant Examiner—Catherine M. Sigda
Attorney, Agent, or Firm—Sughrue, Mion, Zinn, Macpeak & Seas

[57] ABSTRACT

A wire heating torch is mounted closely parallel to a TIG torch 1, and includes a slide base 28 having a vertically adjustable slide shaft 36 disposed therein. A rotatably adjustable slide member 27 is mounted to the lower end of the slide shaft, and carries an angularly disposed guide member 26 for directing the feed of an electrically heated welding wire 5. A conduit cable 44 for the torch includes an electrical power cable 45 and a wire feed liner 60 wrapped by a spring tube 50, both encased within a thermally shrinkable insulating tube 64 to form an integral assembly.

14 Claims, 11 Drawing Figures

HOT WIRE TYPE ARC WELDING TORCH AND CABLE

BACKGROUND OF THE INVENTION

This invention relates to an improved hot wire arc welding torch, and to a conduit cable therefor.

U.S. Pat. Nos. 3,122,629 and 3,163,743 disclose an arc welding method which does not consume any electrode, but employs a hot wire. According to this method an electric current is supplied to a wire so that it may be heated by the Joule effect, ($I^2R$) and fed to an arc. This method enables welding at a greatly improved rate as compared with welding in which the wire is not heated, but is not well suited for manual usage since it requires two relatively large torches, i.e., a torch for producing an arc and a torch for heating the wire. In order to enable manual welding it is necessary to construct the two torches as an integral assembly, and to reduce its size as far as practically possible. To reduce the size of the assembly it is beneficial to secure the wire heating torch closely adjacent to the TIG (Tungsten Inert Gas) torch with the wire feed end of the former inclined relative to the TIG torch.

A known apparatus of this type is shown in FIG. 1, wherein a TIG torch 1 holds a coaxial tungsten electrode 2. A shielding nozzle 3 shields an arc 6 and a weld puddle 10 with inert gas. A holder 4 secures a wire heating torch to the TIG torch. The holder 4 is a split clamping ring having a slot 8 which is narrowed to secure the wire heating torch to the TIG torch by tightening a bolt 7. A vertical adjusting unit 11 includes a threaded guide bar 15 along which a horizontal adjusting unit 12 is moved by turning a knob 13. The horizontal adjusting unit includes parallel guide bars 16 along which a cylindrical housing fixture 24 is movable by rotating a knob 14.

A supply conduit 17 is secured in the center of a current feeder 19. A copper wire 18 has one end brazed to the current feeder, while the other end of the wire is connected to an alternating current power source 20 for heating the wire. The current feeder 19 has an internally threaded lower end which receives a current feeding tip 22. An insulating cap nut 21 is disposed between the current feeder 19 and the tip 22. An insulating spacer 23 has an enlarged diameter flange at its upper end, and isolates the tip 22 from the fixture 24. A guide member 26 is threaded into the lower end of the fixture 24, and mounts an insulating sleeve 25 which guides a feed wire 5. An insulating cap tube 34 surrounds the current feeder 19.

In operation, the lower ends of the electrode 2 and the wire 5 are appropriately positioned relative to each other by the vertical and horizontal adjusting units 11 and 12 on which the housing fixture 24 is mounted. The wire 5 supplied from a source (not shown) to the conduit 17 is fed into the weld puddle 10 through the tip 22, the insulating spacer 23 and the insulating guide sleeve 25. An electric current for heating the wire 5 is supplied from the power source 20 to the tip 22 through the copper wire 18 and the current feeder 19. The wire 5 is heated to a temperature just below its melting point due to the resistance of the wire between the lower end of the tip 22 and the weld puddle 10. The working end of the wire is thereafter melted by the heat of the arc 6 and the weld puddle, and the molten wire material is thus fused to the workpiece 9.

This prior art type of hot wire arc welding torch construction has a relatively wide wire feed angle $\ominus$, which makes it rather large, cumbersome and difficult to handle and manipulate. Moreover, as the insulating spacer 23 has a smooth outer peripheral surface, the exchange or replacement of the current feeding tip 22 is likely to result in the simultaneous detachment of the insulating spacer and its breakage by falling onto the floor.

A further aspect of this invention relates to a conduit cable for a hot wire type of arc welding torch. A typical prior art construction of such a conduit cable arrangement is shown in FIGS. 4 through 6, wherein a TIG torch 1 is coupled to a wire heating torch 42, and a cable 43 for the TIG torch comprises a gas hose 46, a water hose 47, a power cable 48 and a control cable 49. A conduit cable 44 is connected to a wire supply source (not shown), and feeds the welding wire 5 to the welding zone after it has been electrically heated by the torch 42.

FIG. 5 shows the end of the cable 44 which is connected to the wire supply source. A fixture 80 is secured to a connector 70 in the wire supply source, and has an axial bore in which a liner 60 is disposed for guiding the welding wire. The liner 60 is protected by a spring tube 50 which comprises a tight coil of steel wire. An insulating tube 51 surrounds the spring tube to prevent any electrical shock in the event that the liner 60 becomes worn to bring the welding wire into contact with the spring tube. A reinforcing rubber sleeve 90 protects the cable 44 against distortion when it is connected to the wire supply source.

FIG. 6 shows the end of the cable 44 which is connected to the wire heating torch 42. A tip 56 for feeding electrical current to the welding wire is threaded to a fixture 54, and secured to the wire heating torch 42 by a thumb screw 55. A power cable 45 for supplying electrical current to the torch is provided at its opposite ends with terminals 52 and 58 which are secured to the connector 70 and the torch 42 by bolts 53 and 57.

The current feeding tip 56 and the liner 60 are consumable parts which become worn as the welding wire passes through them, whereby they must be periodically changed. To install a new tip the thumb screw 55 is loosened and the bolt 57 securing the power cable 45 is removed so that the cable and the tip may be detached from the torch 42 together. The tip is thereafter unscrewed from the fixture 54, and a new tip is installed. If it is necessary to change the liner 60, the fixture 80 for the cable 44 and the power cable 45 are detached from the connector 70, whereafter the liner is removed and exchanged for a new one.

In such a conventional conduit cable construction it is necessary to detach the electrical power cable when changing consumable parts such as the current feeding tip and the liner, which is both troublesome and time consuming. Moreover, the thumb screw securing the tip to the wire heating torch can easily become loosened during use. Finally, as the liner is only reinforced by the spring tube, fine "stuttering" vibrations are often generated due to the resistance of the wire as it is being fed, and such feed rate disruptions can adversely affect the quality of the weld bead.

SUMMARY OF THE INVENTION

An object of this invention is thus to eliminate the above disadvantages and drawbacks of the prior art by providing a hot wire type of arc welding apparatus including a wire heating torch mounted in parallel and in close proximity to a TIG torch except at its lower end, which is inclined or angled towards the TIG torch to thereby result in a more compact and more easily manipulable construction.

It is a further object of this invention to eliminate the above described disadvantages of the prior art conduit cable for a hot wire arc welding torch, by providing an improved such conduit cable which is both easy to install and remove, and which is sufficiently rigid to resist and dampen out any appreciable vibrations when the welding wire is fed through the cable. This object is achieved by the provision of an insulating tube enclosing the power cable and the conduit cable to form an integral assembly, and by integrating both ends of the power cable with the associated conduit cable fittings.

DETAILED DESCRIPTION OF THE PREFERRED EMBODIMENTS

Figure 1:
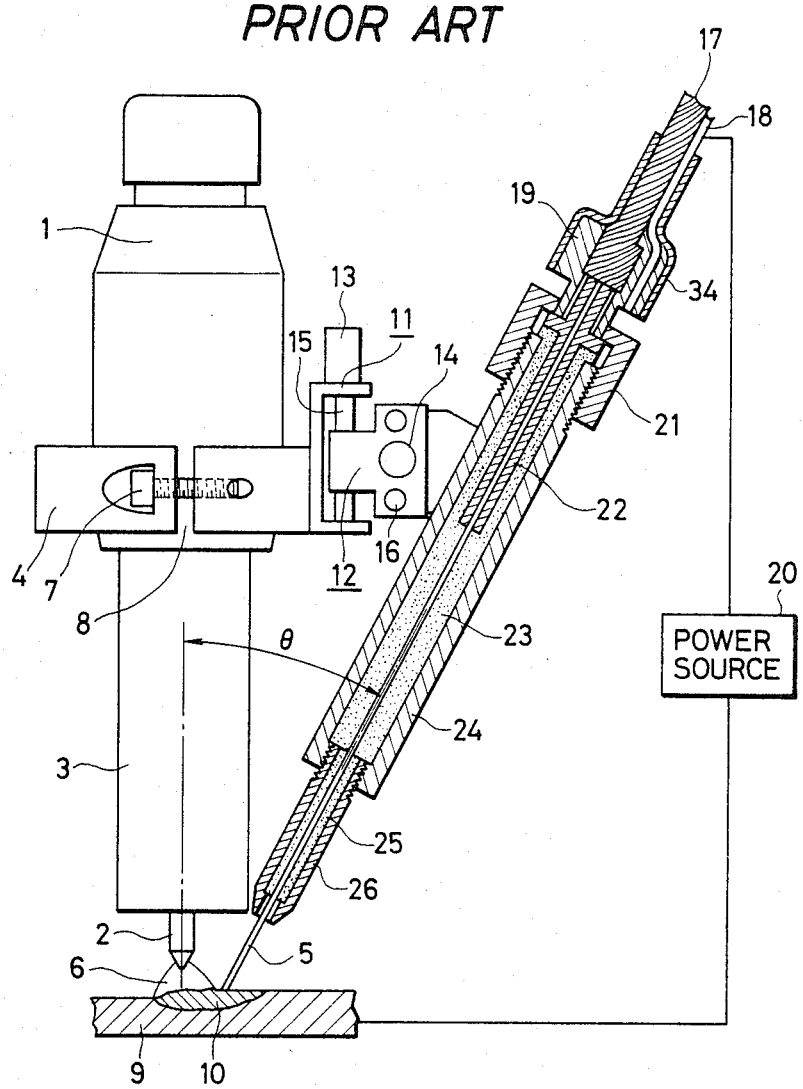
FIG. 1 is a front elevational view, partly in section, of a conventional hot wire arc welding torch.
Figure 2:
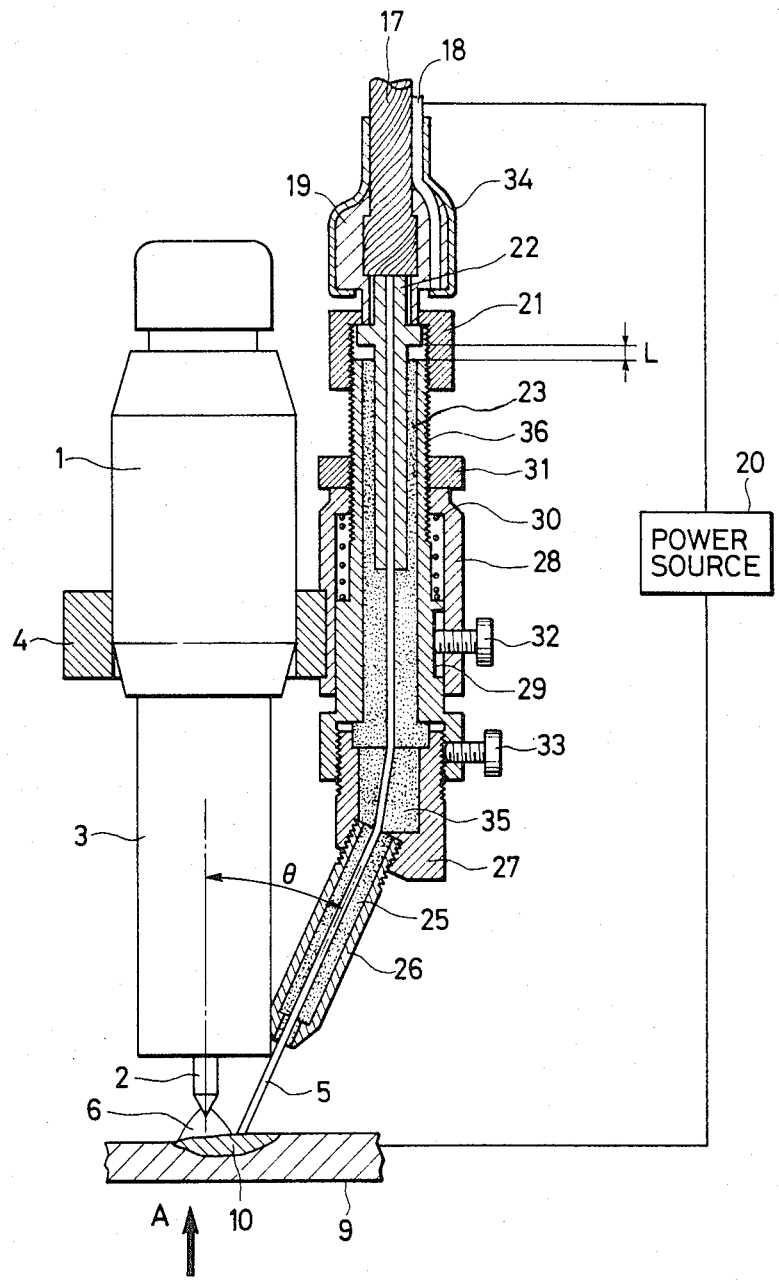
FIG. 2 shows a similar front elevation of a hot wire arc welding torch according to this invention.
Figure 3:
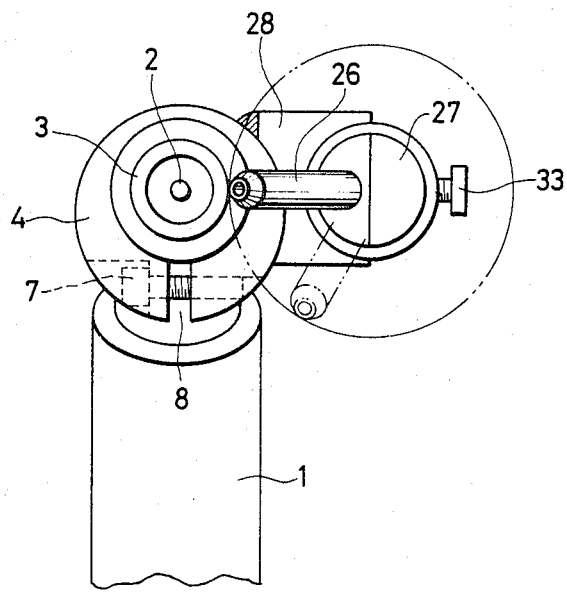
FIG. 3 shows a bottom view of the apparatus of FIG. 2 taken in the direction of arrow A.
Figure 4:
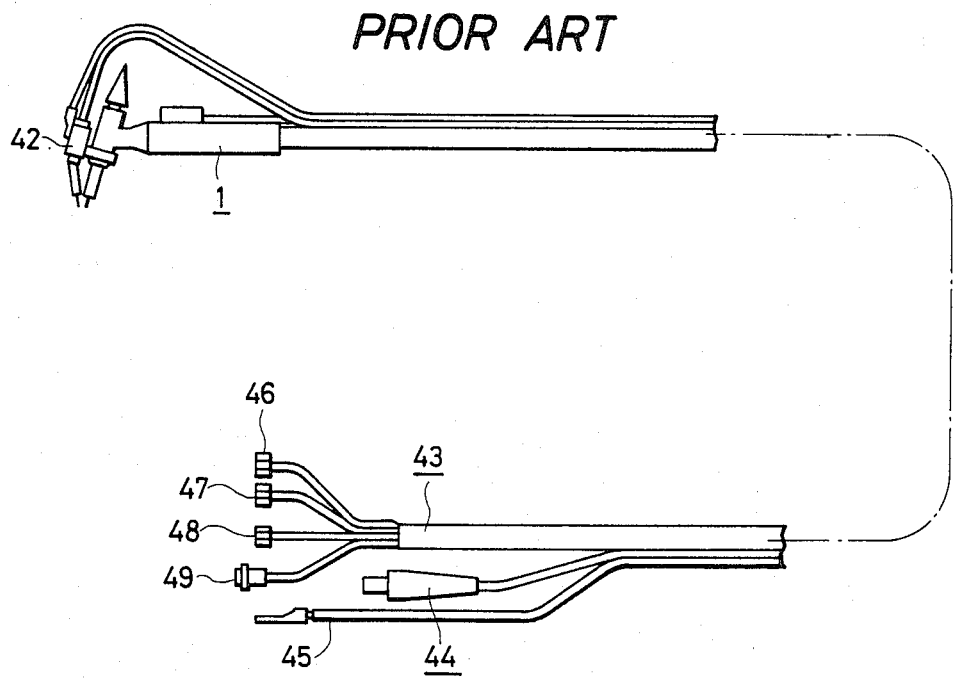
FIG. 4 shows a conventional conduit cable arrangement for a hot wire arc welding torch.
Figure 5:
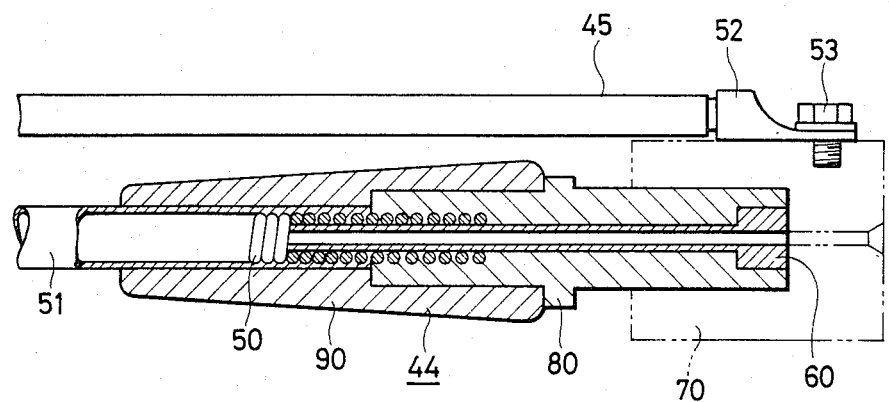
FIG. 5 shows an enlarged view, partly in section, of the FIG. 4 cable connected to a wire supply source.
Figure 6:
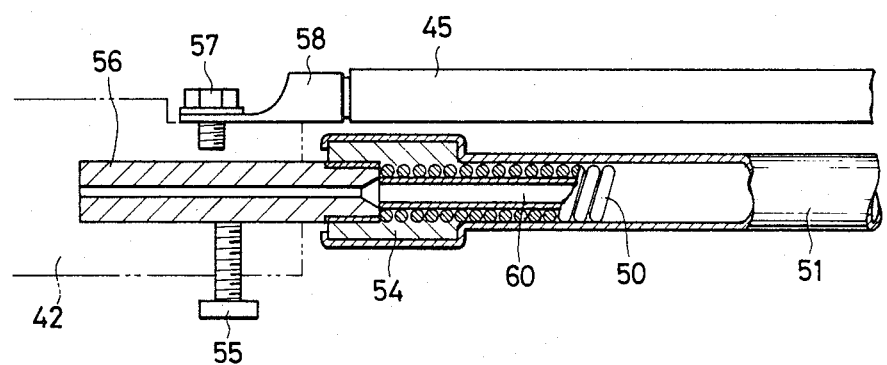
FIG. 6 shows a similar enlarged sectional view of the FIG. 4 cable connected to a wire heating torch.
Figure 7:
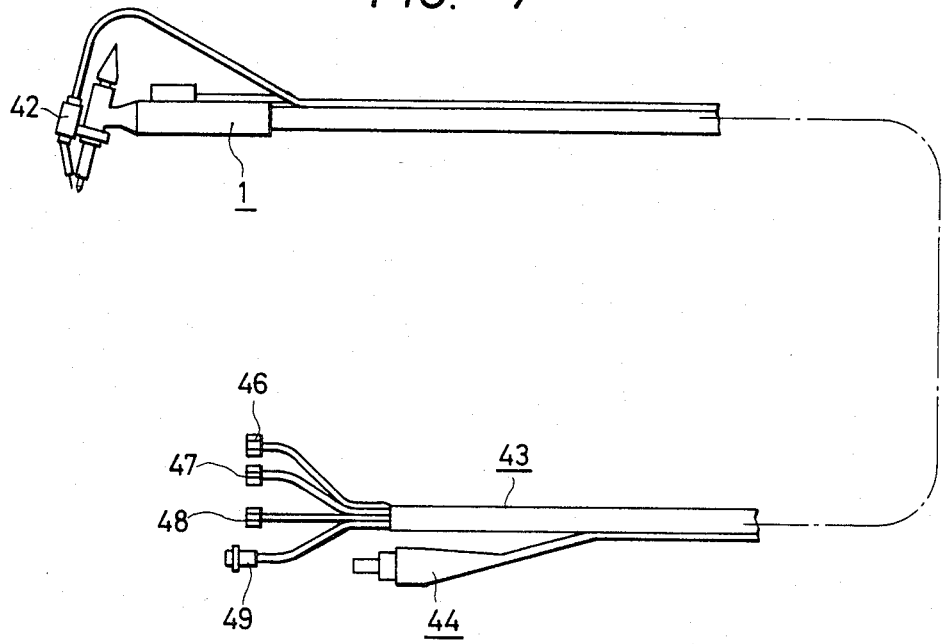
FIG. 7 shows a conduit cable arrangement according to this invention.

Referring to FIGS. 2 and 3, wherein like structural elements are designated by the same reference numerals as in FIG. 1, the holder 4 mounts the wire heating torch parallel and in close proximity to the TIG torch 1. Thus, a slide base 28 is welded to the holder 4, and a slide shaft 36 is vertically movable in the slide base. An adjusting nut 31 is threaded about the upper portion of the slide shaft 36. A coil spring 30 is disposed between the slide base 28 and the slide shaft to urge the latter downwardly. Thus, when the nut 31 is turned it remains vertically stationary, but effects a vertical adjustment of the slide shaft. The slide shaft is provided with a detent groove 29 which receives the end of a locking knob 32 threaded through the slide base 28. The slide shaft 36 has an internally threaded lower end which receives a slide member 27 mounting an insulating tube 35 therein. The slide member 27 has a threaded opening at its bottom whose axis is inclined or angled towards the electrode 2. The guide member 26 is threaded into the opening of the slide member 27, and mounts the insulating guide sleeve 25 therein. A locking knob 33 is threaded through the side of the slide shaft 36 for fixing the rotational position of the slide member 27 and thereby the position of the wire 5. The insulating spacer 23 in this instance has an enlarged diameter flange at its lower end, and is disposed between the current feeding tip 22 and the slide shaft 36.

In operation, the knob 32 is first loosened and the nut 31 is rotated to vertically adjust the slide shaft 36 to establish the desired vertical position of the lower end of the wire 5 in relation to the tip of the electrode 2. After this adjustment has been made the knob 32 is tightened to thereby fix or lock the vertical position of the slide shaft 36. The knob 33 is then loosened and the slide member 27 is rotated, as shown in FIG. 3, to establish the desired horizontal position between the lower ends of the wire 5 and the electrode 2, whereafter the knob 33 is tightened to lock the slide member to the slide shaft. During the vertical adjustment the coil spring 30 prevents any free upward displacement of the slide shaft 36. The letter L in FIG. 2 indicates the distance required for insulation between the current feeding tip 22 and the slide shaft, which is usually in the range of 1 to 2 mm.

As may easily be seen by comparing FIGS. 1 and 2, the construction of this invention is more compact and easier to handle and manipulate than that of the prior art. Moreover, owing to the lower flange of the insulating spacer, this member remains in place when the current feeding tip is changed to thereby preclude its dropping and breakage.

Figure 8:
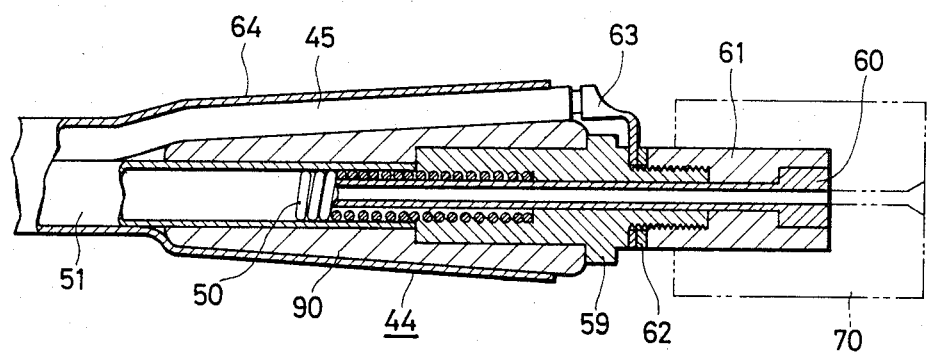
FIG. 8 shows an enlarged sectional view of the FIG. 7 cable connected to a wire supply source.

Turning now to the conduit cable aspect of the invention as illustrated in FIGS. 7 through 11, one end of the modified cable 44 may be connected to a wire supply source fitting as shown in FIG. 8. An electrical current feeder 61 is secured within the connector 70. An adaptor 59 is threaded to the current feeder, and a terminal 63 for the power cable 45 and an elastic washer 62 are disposed between the adaptor 59 and the current feeder. The adaptor and the feeder are formed with an axial bore in which the liner 60 for guiding the welding wire is fitted. The spring tube 50 for protecting the liner is threaded into the adaptor 59, and is surrounded by an insulating tube 51 as before. A thermally shrinkable insulating tube 64 encloses the cable 44, the power cable 45 and the reinforcing rubber sleeve 90 to thereby define an integral assembly.

Figure 9:
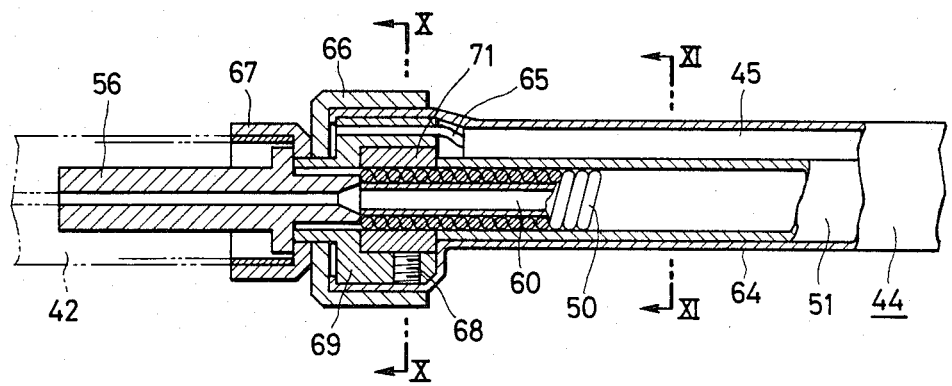
FIG. 9 shows an enlarged sectional view of the FIG. 7 cable connected to a wire heating torch.
Figure 10:
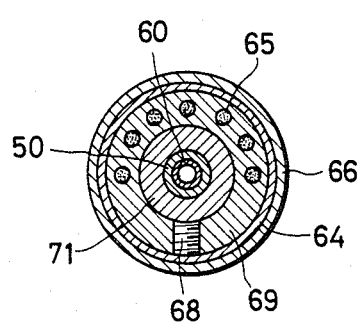
FIG. 10 shows a sectional view taken along the line X—X of FIG. 9.
Figure 11:
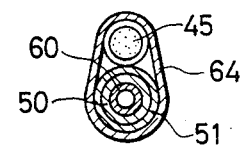
FIG. 11 shows a sectional view taken along the line XI—X1 of FIG. 9.

The other end of the cable 44 is connected to the wire heating torch 42 as shown in FIGS. 9 to 11. The electrical current feed tip 56 is threaded to a current feed ring 69. The torch 42 and the cable 44 are held together by an insulating cap nut 67 and an insulating sleeve 66. The ring 69 mounts a fixture 71 in which the spring tube 50 is threaded, and which is secured therein by a screw 68. The power cable 45 includes a plurality of conductors 65 individually received in a plurality of small holes or apertures in the ring 69, and integrally joined thereto by brazing or the like. The ring 69 defines the largest diameter of the cable 44, and the insulating sleeve 66 protects the insulating tube 64 against damage if the cable falls to the floor, for example.

When it is necessary to change the current feeding tip 56 the cap nut 67 is simply unscrewed and the cable 44 is detached. The tip is then unthreaded from the ring 69 and exchanged for a new one. Similarly, to change the liner 60 the cable 44 is detached from the connector 70, whereby the liner can simply be removed and exchanged for a new one.

Thus, and according to this aspect of the invention, the conduit cable for guiding the welding wire and the electrical power cable are enclosed in a thermally shrinkable insulating tube to form an integral assembly, and the power cable is integrated at both ends with the conduit cable. It is therefore easy to exchange the consumable parts in the conduit cable, and as such cable construction has improved rigidity it effectively resists any vibrations when the wire is being fed to thereby ensure a smooth and stable feed rate. Moreover, since the current feeding ring 69 is surrounded by the insulating tube 64 which is in turn surrounded by the insulating sleeve 66, a high degree of safety is provided against electrical shocks.

What is claimed is:

1. A hot wire arc welding torch apparatus, comprising:
   (a) a non-consumable electrode (2);
   (b) a nozzle surrounding said electrode for supplying a shielding gas to an arc (6) and a weld puddle (10) formed on a workpiece (9);
   (c) a TIG welding torch (1) mounting said electrode and nozzle;
   (d) a vertical adjusting unit (28-32) disposed in parallel and in close proximity to said TIG welding torch and attached thereto by a holder (4);
   (e) a slide member (27) rotatably attached to the lower end of a slide shaft (36) which is slidable in said vertical adjusting unit, said slide member being vertically movable with said slide shaft;
   (f) a guide member (26) attached to the lower end of said slide member at an angle to said vertical adjusting unit for feeding a wire (5) of a filler metal to said arc formed between said electrode and said workpiece;
   (g) a wire heating torch attached to the top of said vertical adjusting unit for supplying an electric current to said wire;
   (h) a power source (20) for supplying an electrical current to a region between said wire and said workpiece through said wire heating torch to heat said wire; and
   (i) a conduit cable (44) including an electrical power cable (45) connected to an upper end of said wire heating torch for feeding said wire;
   (j) said wire being fed through said wire heating torch, said vertical adjusting unit and said guide member; and
   said conduit cable comprising:
      a liner (60) for guiding a welding wire (5);
      a protective spring tube (50) surrounding said liner;
      an adaptor (59) surrounding one end of said tube;
      a current feeder (61) threadedly connected with said adaptor;
      a current feeding ring (69) surrounding the other end of said tube;
      a power cable (45) extending along said tube for supplying electrical current for heating said wire; and
      a thermally shrinkable insulating tube (64) enclosing said spring tube and said power cable therein to form an integral assembly;
      said power cable having at one end a conductor (63) held between said adaptor and said current feeder, said conductor being divided at the other end of said cable into a plurality of segments (65) individually secured in a plurality of holes formed in said ring.

2. An apparatus as set forth in claim 1, wherein said vertical adjusting unit comprises a compression spring (30) disposed between the slide shaft and a slide base (28) for urging said slide shaft downwardly, and a knob (32) provided on said slide base for fixing said slide shaft and said slide base in a desired vertical positional relationship to each other.

3. An apparatus as set forth in claim 2, wherein said slide shaft has a groove (29) extending in a direction in which said slide shaft is slidable, said knob being threadedly connected to said slide base and having an end engaged in said groove.

4. An apparatus as set forth in claim 1, further including an insulating spacer (23) having an enlarged diameter flange at its lower end, said spacer being disposed between said slide member and a main body of said wire heating torch.

5. An apparatus as set forth in claim 2, further including an insulating spacer (23) having an enlarged diameter flange at its lower end, said spacer being disposed between said slide member and a main body of said wire heating torch.

6. An apparatus as set forth in claim 3, further including an insulating spacer (23) having an enlarged diameter flange at its lower end, said spacer being disposed between said slide member and a main body of said wire heating torch.

7. An apparatus as set forth in claim 4, further including a current feeding tip (22), said spacer having an axial bore, said tip having a first portion held in said bore, and a second portion having a diameter equal to that of said first portion and projecting from said bore a distance of from 1 to 2 mm.

8. An apparatus as set forth in claim 5, further including a current feeding tip (22), said spacer having an axial bore, said tip having a first portion held in said bore, and a second portion having a diameter equal to that of said first portion and projecting from said bore a distance of from 1 to 2 mm.

9. An apparatus as set forth in claim 6, further including a current feeding tip (22), said spacer having an axial bore, said tip having a first portion held in said bore, and a second portion having a diameter equal to that of said first portion and projecting from said bore a distance of from 1 to 2 mm.

10. A conduit cable for a hot wire arc welding torch, comprising:
   (a) a liner (60) for guiding a welding wire (5);
   (b) a protective spring tube (50) surrounding said liner;
   (c) an adaptor (59) surrounding one end of said tube;
   (d) a current feeder (61) threadedly connected with said adaptor;
   (e) a current feeding ring (69) surrounding the other end of said tube;
   (f) a power cable (45) extending along said tube for supplying electrical current for heating said wire; and
   (g) a thermally shrinkable insulating tube (64) enclosing said spring tube and said power cable therein to form an integral assembly;
   (h) said power cable having at one end a conductor (63) held between said adaptor and said current feeder, said conductor being divided at the other end of said cable into a plurality of segments (65) individually secured in a plurality of holes formed in said ring.

11. An apparatus as set forth in claim 10, wherein said insulating tube surrounds said current feeding ring, and further comprising an insulating sleeve (66) surrounding said current feeding ring and said insulating tube.

12. A cable as set forth in claim 10, wherein said insulating tube surrounds said current feeding ring, and further comprising an insulating sleeve (66) surrounding said current feeding ring and said insulating tube.

13. An apparatus as set forth in claim 11, further comprising a sleeve fixture (71) mounted within said current feeding ring, wherein said spring tube comprises a helically coiled wire, and wherein opposite ends of said spring tube are threaded into said sleeve fixture and said adaptor.

14. A cable as set forth in claim 12, further comprising a sleeve fixture (71) mounted within said current feeding ring, wherein said spring tube comprises a helically coiled wire, and wherein opposite ends of said spring tube are threaded into said sleeve fixture and said adaptor.

* * * * *